United States Patent [19]
McNeil

[11] 3,886,905
[45] June 3, 1975

[54] FISH PROPAGATION METHOD

[76] Inventor: William J. McNeil, P.O. Box 1054, Auke Bay, Alaska 99821

[22] Filed: Oct. 4, 1973

[21] Appl. No.: 403,435

[52] U.S. Cl. ................................................ 119/3
[51] Int. Cl.: ........................................... A01k 61/00
[58] Field of Search .................................... 119/2–5

[56] References Cited
UNITED STATES PATENTS

| 148,035 | 3/1874 | Clark | 119/3 |
|---|---|---|---|
| 166,413 | 8/1875 | Roth | 119/3 |
| 680,838 | 8/1901 | Bourgeois | 119/3 |
| 3,028,837 | 4/1962 | Tuttle | 119/3 |
| 3,464,387 | 9/1969 | Martinez | 119/3 |
| 3,702,599 | 11/1972 | Herolzer | 119/4 |

FOREIGN PATENTS OR APPLICATIONS

| 952,970 | 11/1949 | France | 119/3 |

*Primary Examiner*—Louis G. Mancene
*Assistant Examiner*—J. N. Eskovitz
*Attorney, Agent, or Firm*—Kolisch, Hartwell, Dickinson & Stuart

[57] ABSTRACT

A method and apparatus for propagating fish from fish eggs. A layered deposit of fertilized eggs is prepared within a confined zone circumscribed by the walls of a tank. Eggs incubate in this layered deposit, with the production of alevins therefrom. The alevins are permitted to escape from the deposit downwardly to lodge on a tactile substrate conducive to the development of fish fry from the alevins. The fish fry may then escape from the tank. The incubation process is carried out with the exclusion of light. A support for the deposit of eggs may take the form of perforate trays radiating outwardly from a common mounting. The alevins escape through the perforations of the trays in their passage downwardly to the substrate where incubation of the alevins to produce fish fry takes place.

6 Claims, 4 Drawing Figures

PATENTED JUN 3 1975 3,886,905
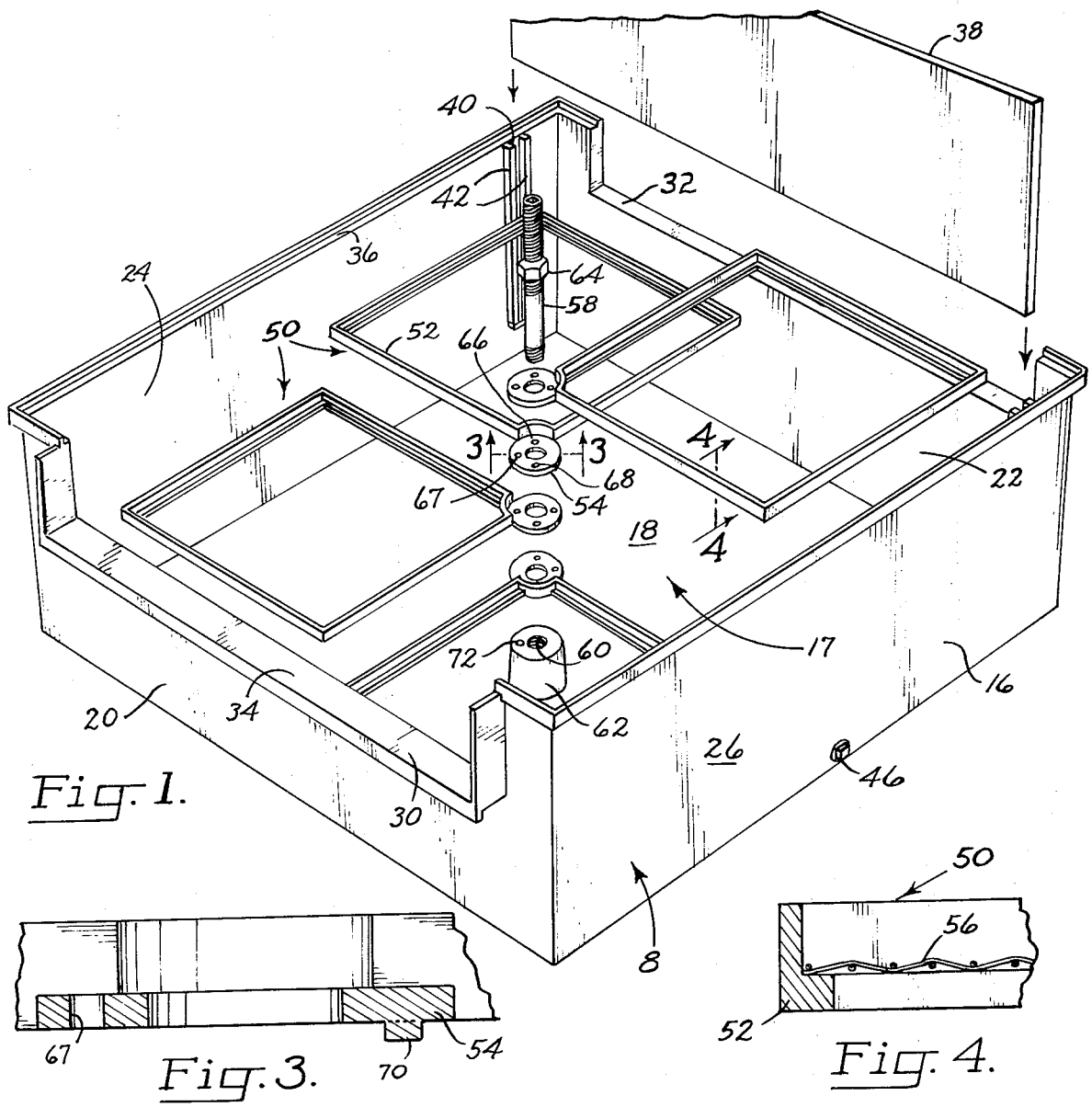
Fig. 1.
Fig. 3.
Fig. 4.
Fig. 2.
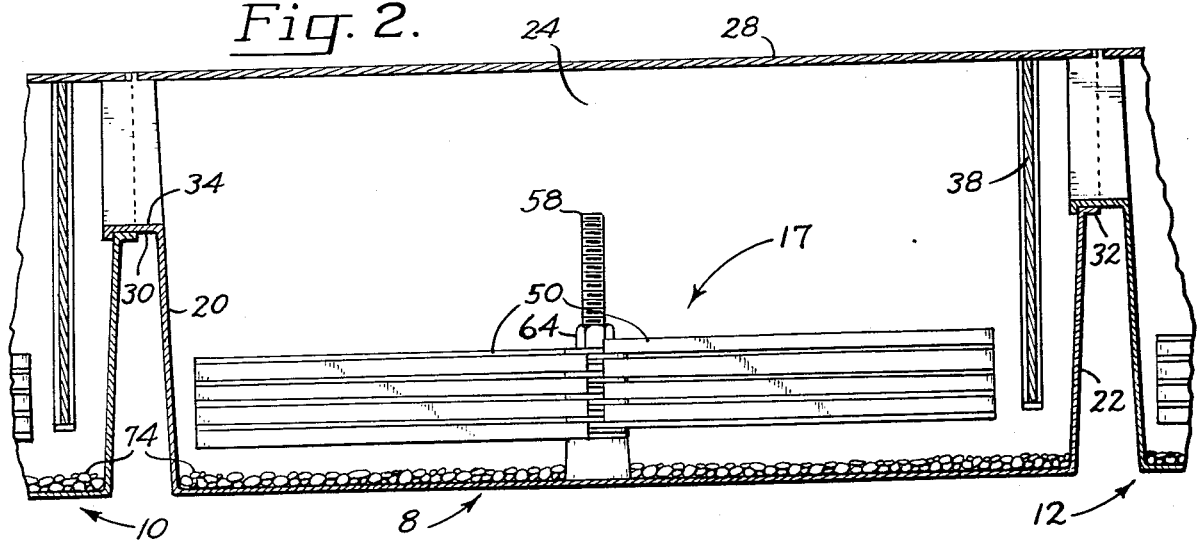

FISH PROPAGATION METHOD

This invention relates generally to the production of fish fry from fish eggs.

In certain fish species, as exemplified by the chum and pink salmon, the small adult fish, or fry, develop from eggs spawned by the female fish. The eggs after fertilization and a certain preliminary incubation period, transform into alevins as an intermediate stage in the development of the fry. A developing alevin has somewhat the shape of a young adult fish, but unlike the fry, includes an attached yolk sac which is the remnant of the egg from which the alevin grew.

In a conventional hatchery, typically eggs and alevins are concentrated in troughs provided with means for circulating water over the troughs at a velocity which may greatly exceed the flow of water in a natural spawning bed. There generally is little, if any, restriction to movement of alevins in an open hatchery system, and as the result the alevins during their development into fish fry are required to be relatively active.

This invention is based on studies that have been made confirming that smaller fry are produced under conditions of the type just described, than under the conditions of a natural spawning bed. It has been determined that a factor in the production of such smaller and weaker fry is the relatively high incidence of malformed yolk sacs among alevins which mature on smooth substrates and under conditions inducing activity in the alevins. This malformation is the result of mechanical injury to the yolk sacs. Further explaining, frequent rubbing of the yolk sac on a flat substrate causes an abrasion which permits water to penetrate the sac and leads to coagulation of the yolk and an elongation of the posterior part of the yolk sac. This coagulation apparently prevents normal circulation of blood, and even may contribute to mortality of alevins in extreme cases.

One general object of this invention is to provide a unique method of propagating fish fry from eggs which has been found to result in the production of larger and stronger fry than those produced using normal hatchery techniques.

More specifically, an object is to provide such a method wherein the eggs are processed during their incubation from eggs into alevins and subsequently into fish fry, under conditions minimizing mechanical injury to the yolk sac of the alevins whereby the sac and its contents may be absorbed in a normal manner with stronger fry resulting.

In furtherance of the above, the method of the invention contemplates preparing a layered deposit of fertilized eggs in a zone of water from which light preferably is excluded. The eggs are subjected to an initial incubation period during which time the fish eggs develop into alevins. The alevins then are permitted to escape from the region of the deposit of eggs, and to pass downwardly in said zone of water to lodge on a tactile substrate at the base of the zone of water where further incubation proceeds. The substrate, which may be gravel, or such material as artificial turf, serves to provide a resting place where the alevins may rest without excessive activity. The dark conditions utilized during the period of alevin development serves further to inhibit activity in the alevins.

Related features and objects attained by the invention comprise a method of propagating fish which enables a relatively large volume of eggs to be handled in a relatively small space, the provision of a method which enables unfertilized eggs to be removed during the incubation process, the provision of a method of propagating fish which may be maintained relatively clean thus to inhibit disease and the like, and the provision of a method which requires minimal handling of propagating medium and minimal maintenance of the hatchery during the time that propagation takes place.

In a specific and preferred embodiment of the invention, the fertilized eggs are prepared as layered deposits on perforate trays supported within a tank. Emerging alevins are permitted to escape through the perforations of the trays, whence they gather on a substrate of gravel and the like where further incubation of the alevins takes place. Fresh water is circulated through the tank in a manner which minimizes alevin activity.

Further encompassed within the invention is the provision of apparatus for carrying out the method of the invention. In a particular and preferred embodiment of the invention, a modular type of construction is contemplated, comprising tanks in fluid communication with each other to enable the passage of circulating water from one tank to another, each tank defining a zone for the placement of trays as described and having a detachable cover which closes off the inside of a tank from light.

These and other objects and advantages of the invention will become more fully apparent from a reading of the accompanying description wherein:

FIG. 1 is a perspective, partially exploded view of a "cell" in hatchery apparatus as contemplated by a preferred embodiment of the invention, such cell including a tank with trays supported therein;

FIG. 2 is a cross-sectional view, showing three cells mounted side-by-side, as might be done in a hatchery; and FIGS. 3 and 4 are cross-sectional views, somewhat enlarged, taken along the lines 3—3 and 4—4, respectively, in FIG. 1.

Describing now in detail a preferred and specific embodiment of the invention, the method contemplated comprises preparing layered deposits of fertilized eggs on multiple trays mounted within one or more tanks. These tanks are maintained substantially full of water, whereby the eggs on the trays are submerged in water, and this water is constantly circulated through the various tanks. The eggs remain on such trays for an initial incubation period, during which time the eggs mature into alevins which, as already has been explained, are immature fish with egg sacs and yolk attached.

The trays have perforate bottoms. The perforations are not so large as to permit the fertilized eggs to fall through the trays. However, the alevins that form are of such size that they may move through such perforations downwardly in the tanks, thence to come to rest on a tactile substrate provided in the tanks. This substrate, which in a preferred embodiment comprises a layer of gravel, affords the alevins a resting place, where they may remain within the tank for a period of time while in a relatively inactive state. During this time, further incubation takes place with the developing alevins absorbing their attached yolk material. At the completion of the incubation period, fish fry are produced which may be transferred to other regions of a hatchery, or to natural waters (depending upon the type of fish involved).

The tanks in addition to including side walls and a base are provided with detachable covers or tops. When these are in place, they are effective to exclude light from the interior of the tanks. This is important since with even a small amount of light, the activity of the alevins substantially increases. With the covers being removable, an opportunity is provided during the incubation of the eggs to inspect the trays and remove nonfertilized eggs and the like, which otherwise would deteriorate within the tanks. With the eggs layered out on the trays, this is a relatively easy operation to perform.

Referring to the drawings, and more particularly to FIG. 1, illustrated therein are portions of a cell 8, including a tank 16, and tray structure 17 disposed within the tank. The cell may be mounted next to similar cells, as indicated in FIG. 2 by the cells 8, 10 and 12, to produce a modular-type hatchery system.

In FIG. 1, the tank 16 illustrated has a substantially rectangular shape. The tank includes a base 18, and side walls 20, 22, 24, 26. Also part of a tank is a detachable cover or top, not pictured in FIG. 1, but shown in FIG. 2 at 28.

Opposed side walls 20, 22 include trough portions 30, 32 recessed downwardly from upper margins of these side walls. Trough portion 30 is bounded by a lip 34 adapted to nest over the outline of trough portion 32 of an adjacent like tank. With cells arranged in series as in FIG. 2, the trough portions described enable the circulation of water through the various cells, with water flowing from one cell to the next in the series.

A shelf 36 (see FIG. 1) is defined extending along the top margins of the tank side walls. The shelf forms a seat for the margins of top 28 (see FIG. 2), with such positioned to close off the top of the tank.

Mounted in a substantially vertical position adjacent trough 32 is a baffle 38. Opposed end margins of the baffle seat within channels defined on the inside of the tank, exemplified by channel 40 defined between opposed rails 42.

With the baffle in place and referring to FIG. 2, water flowing into the cell through trough portion 32 is directed downwardly to adjacent the base of the tank in the cell. The water thence flows upwardly through tray structure 17, and leaves the cell through outlet trough portion 30.

A drain for the tank may be provided, with such normally closed off as by plug 46.

Tray structure 17 comprises multiple trays or supports 50 with perforate bottoms, disposed at different elevations in the tank, and provided for the purpose of laying out fish eggs thereon. Each tray 50 includes a rectangular frame 52, joined to an annular portion 54 provided at one corner of the tray. The floor of the tray may comprise a nylon screen or other perforate means 56 (see FIG. 4) suitably secured to the encompassing frame 52. The various trays are secured in place within the tank utilizing a spindle 58 extending through the annular portions of the various trays. The base of spindle 58 is threaded, and with the tray structure assembled, it is received within internally threaded bore 60 of a support 62 projecting up from the floor of the tank. A nut 64 on an upper threaded end of the spindle is turned to clamp the annular portions 54 of the trays against each other.

Referring to FIGS. 1 and 3, each annular portion 54 of a tray includes three bores 66, 67, 68 extending therethrough, with there being a 90° spacing between the various bores. On the underside of an annular portion, and diametrically across from bore 67, is a depending projection 70 shaped to fit within a bore 66, 67, 68. With the construction described, and when assembling the tray structure, the various trays are set so that a projection corresponding to projection 70 for a tray fits within one of the bores 66, 67, 68 of the annular portion in the tray below it. The base tray is anchored by the bore 72 provided in the top of support 62. In the assembled tray structure, the trays radiate outwardly from the vertical mounting provided by spindle 58. Further, each tray is angularly offset 90° from the tray below it.

In the cell shown in FIG. 2, 16 trays have been included in the tray structure, said trays being nested one on top of another in the manner just described. Many of these trays have been eliminated from FIG. 1 for reasons of clarity.

Completing the description of a cell, deposited on the base of the tank is a layer of gravel 74 providing a tactile substrate in the cell receiving the alevins as they drop through the tray floors toward the base of the cell.

Describing the production of fry from eggs according to one manner in which the invention may be performed, eggs may be spread out on the floors of the trays, using in the case of salmon eggs a density of approximately six eggs per square inch surface area of tray. A substrate for the emerging alevins beneath the trays may be provided over the floor of the tank, in the form of a layer of gravel or crushed rock of approximately ¼ to ¾ inch size. Water is circulated through the cell, with the water level in a cell with the apparatus in operation tending to be established at slightly above the level of the base of inlet and outlet troughs 30, 32. During the incubation period, an average apparent velocity of 2 inches per minute flowing upwardly through the egg trays has been found to be sufficient.

After the deposit of fertilized eggs, alevins tend to form over a period of time, with the eggs undergoing a gradual transformation. As incubation progresses, the alevins eventually gain sufficient strength to move around, and with such movement they drop through the interstices of the tray floors to drop to the substrate at the base of the cell. On reaching the substrate, further incubation takes place, with the alevins absorbing their attached yolk sac and its contents. Ultimately, fish fry devoid of yolk sacs are formed. In the case of chum salmon, for instance, fish fry result some 4 months after the deposit of fertilized eggs on the trays. The emerging fry are free to pass upwardly through the trays to leave a cell.

During the incubation of the eggs and alevins, the covers or tops are maintained in place on the tanks to maintain their interiors dark. The covers may be removed on occasion to inspect the interiors of the cells, and to enable, for instance, removal of unfertilized eggs, but the length of time that the covers remain removed in comparison to the total incubation period is insignificant.

While a specific embodiment of the invention has been described, it is not intended to be limited in all details to the particulars of the method and apparatus disclosed, as modifications and variations would be apparent to one skilled in the art.

It is claimed and desired to secure by Letters Patent:

1. A method of propagating fish from fish eggs comprising preparing on a perforate support submerged in water a deposit of fertilized eggs, incubating the eggs in said deposit to produce alevins therefrom, which alevins include attached yolk sacs which are the remnants of the eggs from which the alevins were produced, allowing said alevins with attached yolk sacs to leave said support by escaping downwardly through the perforations of said support, permitting the alevins on escaping through said perforations to nestle within the interstices of a rugose substrate with the alevins sheltered about their sides by such substrate, and further incubating said alevins with such nestled in the interstices of said substrate during the period that yolk sacs are absorbed by said alevins to produce the fry.

2. The method of claim 1, wherein the incubation on said perforate support and incubation on said substrate is performed in the absence of light.

3. The method of claim 1, wherein said support and said substrate are maintained in a zone circumscribed by a water impervious barrier, and water is circulated through said zone by directing such toward the base of such zone and thence upwardly to leave said zone.

4. The method of claim 3, wherein said zone is maintained in a condition closed off to light.

5. The method of claim 1, wherein an escape for developing fish fry is provided disposed above the level of said perforate support.

6. A method of propagating fish from fish eggs comprising preparing a layered deposit of fertilized eggs in a confined zone which is circumscribed by a water barrier with such deposit supported above the base of said zone, incubating the eggs in said deposit to produce alevins therefrom, which alevins include attached yolk sacs which are the remnants of the eggs from which the alevins were produced, during said incubation removing imperfect eggs from said deposit, permitting said alevins with attached yolk sacs and as such are produced to escape from said deposit by moving downwardly toward the base of said zone, receiving alevins escaping from said deposit within the interstices of a rugose substrate with such interstices being of such size as to permit the alevins to nestle therewithin thus to be sheltered about their sides by such substrate, further incubating said alevins with such nestled in the interstices of said substrate during the period that yolk sacs are absorbed by said alevins, and excluding light from said alevin from the time they are produced until yolk sacs absorption is complete.

* * * * *